US008688441B2

(12) United States Patent
Ramabadran et al.

(10) Patent No.: US 8,688,441 B2
(45) Date of Patent: Apr. 1, 2014

(54) METHOD AND APPARATUS TO FACILITATE PROVISION AND USE OF AN ENERGY VALUE TO DETERMINE A SPECTRAL ENVELOPE SHAPE FOR OUT-OF-SIGNAL BANDWIDTH CONTENT

(75) Inventors: Tenkasi V. Ramabadran, Naperville, IL (US); Mark A. Jasiuk, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1008 days.

(21) Appl. No.: 11/946,978

(22) Filed: Nov. 29, 2007

(65) Prior Publication Data

US 2009/0144062 A1 Jun. 4, 2009

(51) Int. Cl.

| | |
|---|---|
| ***G06F 15/00*** | (2006.01) |
| ***G10L 25/00*** | (2013.01) |
| ***G10L 19/00*** | (2013.01) |
| ***G10L 21/00*** | (2013.01) |
| ***G10L 21/02*** | (2013.01) |

(52) U.S. Cl.

USPC ......... 704/228; 704/200; 704/200.1; 704/205

(58) Field of Classification Search

USPC ............................... 704/200–200.1, 205, 228

See application file for complete search history.

(56) References Cited

U.S. PATENT DOCUMENTS

| | | | |
|---|---|---|---|
| 4,771,465 | A | 9/1988 | Bronson et al. |
| 5,245,589 | A | 9/1993 | Abel et al. |
| 5,455,888 | A | 10/1995 | Lyengar et al. |
| 5,579,434 | A | 11/1996 | Kudo et al. |
| 5,581,652 | A | 12/1996 | Abe et al. |

(Continued)

FOREIGN PATENT DOCUMENTS

| | | | |
|---|---|---|---|
| CN | 1272259 | A | 11/2000 |
| CN | 100338649 | C | 9/2007 |

(Continued)

OTHER PUBLICATIONS

J.R. Deller, Jr., J.G. Proakis, and J.H.L. Hansen, Discrete-Time Processing of Speech Signals, New York, NY: McMillan, Chapter 5, pp. 266-281; 1993.

(Continued)

*Primary Examiner* — Eric Yen

(57) ABSTRACT

One provides (101) a digital audio signal having a corresponding signal bandwidth, and then provides (102) an energy value that corresponds to at least an estimate of out-of-signal bandwidth energy as corresponds to that digital audio signal. One then uses (103) the energy value to simultaneously determine both a spectral envelope shape and a corresponding suitable energy for the spectral envelope shape for out-of-signal bandwidth content as corresponds to the digital audio signal. By one approach, if desired, one then combines (104) (on, for example, a frame by frame basis) the digital audio signal with the out-of-signal bandwidth content to provide a bandwidth extended version of the digital audio signal to be audibly rendered to thereby improve corresponding audio quality of the digital audio signal as so rendered.

18 Claims, 3 Drawing Sheets

(56) References Cited

U.S. PATENT DOCUMENTS

| | | | | |
|---|---|---|---|---|
| 5,794,185 | A | 8/1998 | Bergstrom et al. | |
| 5,878,388 | A | 3/1999 | Nishiguchi et al. | |
| 5,949,878 | A | 9/1999 | Burdge et al. | |
| 5,950,153 | A | 9/1999 | Ohmori et al. | |
| 5,978,759 | A | 11/1999 | Tsushima et al. | |
| 6,009,396 | A | 12/1999 | Nagata | |
| 6,453,287 | B1 | 9/2002 | Unno et al. | |
| 6,680,972 | B1 | 1/2004 | Liljeryd et al. | |
| 6,708,145 | B1 | 3/2004 | Liljeryd et al. | |
| 6,732,075 | B1 | 5/2004 | Omori et al. | |
| 6,895,375 | B2 | 5/2005 | Malah et al. | |
| 7,181,402 | B2 | 2/2007 | Jax et al. | |
| 7,328,162 | B2 | 2/2008 | Liljeryd et al. | |
| 7,359,854 | B2 | 4/2008 | Nilsson et al. | |
| 7,461,003 | B1 | 12/2008 | Tanrikuli | |
| 7,483,758 | B2 | 1/2009 | Liljeryd et al. | |
| 7,490,036 | B2 | 2/2009 | Jasiuk et al. | |
| 7,546,237 | B2 | 6/2009 | Nongpiur et al. | |
| 7,555,434 | B2 | 6/2009 | Nomura et al. | |
| 7,844,453 | B2 | 11/2010 | Hetherington | |
| 7,941,319 | B2 | 5/2011 | Nomura et al. | |
| 8,069,040 | B2 | 11/2011 | Vos | |
| 8,229,106 | B2 * | 7/2012 | Greiss et al. | 379/395 |
| 8,249,861 | B2 | 8/2012 | Li et al. | |
| 2002/0007280 | A1 | 1/2002 | McCree | |
| 2002/0097807 | A1 * | 7/2002 | Gerrits | 375/261 |
| 2002/0138268 | A1 | 9/2002 | Gustafsson | |
| 2003/0009327 | A1 * | 1/2003 | Nilsson et al. | 704/219 |
| 2003/0050786 | A1 | 3/2003 | Jax et al. | |
| 2003/0093278 | A1 | 5/2003 | Malah | |
| 2003/0187663 | A1 | 10/2003 | Truman et al. | |
| 2004/0078205 | A1 | 4/2004 | Liljeryd et al. | |
| 2004/0128130 | A1 | 7/2004 | Rose et al. | |
| 2004/0174911 | A1 | 9/2004 | Kim et al. | |
| 2004/0247037 | A1 | 12/2004 | Honma et al. | |
| 2005/0004793 | A1 | 1/2005 | Ojala et al. | |
| 2005/0065784 | A1 | 3/2005 | McAulay et al. | |
| 2005/0094828 | A1 | 5/2005 | Sugimoto | |
| 2005/0143985 | A1 | 6/2005 | Sung et al. | |
| 2005/0143989 | A1 | 6/2005 | Jelinek | |
| 2005/0143997 | A1 | 6/2005 | Huang et al. | |
| 2005/0165611 | A1 | 7/2005 | Mehrotra et al. | |
| 2005/0171785 | A1 | 8/2005 | Nomura et al. | |
| 2006/0224381 | A1 | 10/2006 | Makinen | |
| 2006/0282262 | A1 | 12/2006 | Vos et al. | |
| 2006/0293016 | A1 | 12/2006 | Giesbrecht et al. | |
| 2007/0033023 | A1 | 2/2007 | Sung et al. | |
| 2007/0109977 | A1 | 5/2007 | Mittal et al. | |
| 2007/0124140 | A1 | 5/2007 | Iser et al. | |
| 2007/0150269 | A1 | 6/2007 | Nongpiur et al. | |
| 2007/0208557 | A1 | 9/2007 | Li et al. | |
| 2007/0238415 | A1 | 10/2007 | Sinha et al. | |
| 2008/0004866 | A1 | 1/2008 | Virolainen et al. | |
| 2008/0027717 | A1 | 1/2008 | Rajendran et al. | |
| 2008/0120117 | A1 | 5/2008 | Choo et al. | |
| 2008/0177532 | A1 * | 7/2008 | Greiss et al. | 704/200.1 |
| 2009/0198498 | A1 | 8/2009 | Ramabadran et al. | |
| 2009/0201983 | A1 | 8/2009 | Jasiuk et al. | |
| 2010/0049342 | A1 | 2/2010 | Ramabadran et al. | |
| 2010/0198587 | A1 | 8/2010 | Ramabadran et al. | |
| 2011/0112844 | A1 | 5/2011 | Jasiuk et al. | |
| 2011/0112845 | A1 | 5/2011 | Jasiuk et al. | |

FOREIGN PATENT DOCUMENTS

| | | | |
|---|---|---|---|
| EP | 1 438 524 | A | 7/2004 |
| EP | 1367566 | B1 | 8/2005 |
| EP | 1439524 | A1 | 7/2007 |
| EP | 1892703 | B1 | 10/2009 |
| JP | 90166198 | A | 1/1997 |
| KR | 1020050010744 | A | 1/2005 |
| KR | 1020060085118 | A | 7/2006 |
| WO | 9857436 | A2 | 12/1998 |
| WO | 02086867 | A1 | 10/2002 |
| WO | 2003083834 | A1 | 10/2003 |
| WO | 2009070387 | A1 | 6/2009 |
| WO | 2009099835 | A1 | 8/2009 |

OTHER PUBLICATIONS

L.R. Rabiner and R.W. Schafer, Digital Processing of Speech Signals, Englewood Cliffs, pp. 274-277, NJ: Prentice-Hall, 1978.

Bernard Eozenou, "PCT International Search Report and Written Opinion," WIPO, ISA/EP, European Patent Office, Rijswijk, NL, Jan. 19, 2009.

Yan Ming Cheng et al., "Statisticval Recovery of Wideband Speech From Narrowband Speech," IEEE Transactions on Speech and Audio Processing, vol. 2, No. 4, pp. 544-546, Oct. 1994.

Peter Jax et al., "Wideband Extension of Telephone Speech Using a Hidden Markov Model," Institute of Communication Systems and Data Processing, RWTH Aachen, Templegrabel 55, D-52056 Aachen, pp. 133-135, Germany @2000 IEEE.

Mattias Nilsson et al., "Avoiding Over-Estimation in Bandwidth Extension of Telephony Speech," Department of Speech, Music and Hearing KTH (Royal Institute of Technology) pp. 869-872 @2001 IEEE.

Julien Epps, "Wideband Extension of Narrowband Speech for Enhancement and Coding," School of Electrical Engineering and Telecommunications, The University of New South Wales, pp. 1-155, a thesis submitted to fulfil the requirements of the degree of Doctor of Philosophy Sep. 2000.

Laaksonen et al.; "Artificial Bandwidth Expansion Mehod to Improve Intelligibility and Quality of AMR-Coded Narrowband Speech," Multimedia Technologies Laboratory and Helsinki University of Technology, pp. I-809-812@2005 IEEE.

Kontio et al.; "Neural Network-Based Artificial Bandwidth Expansion of Speech," IEEE Transactions on Audio, Speech, and Language Processing, pp. 1-9, @2006, IEEE.

Park et al.; "Narrowband to Wideband Conversion of Speech Using GMM Based Transformation," Dept. of Electronics Engineering, Pusan National University, pp. 1843-1846 @2000, IEEE.

Harald Gustafsson e al.; "Low-Complexity Feature-Mapped Speech Bandwidth Extension," IEEE Transactions on Audio, Speech, and Language Processing, vol. 14, No. 2, pp. 577-588, Mar. 2006.

Uysal et al.; "Bandwidth Extension of Telephone Speech Using Frame-Based Excitation and Robust Features," Computational NeuroEngineering Laboratory, The University of Florida.

Kornagel, "Improved Artificial Low-Pass Extension of Telephone Speech," International Workshop on Acoustic Echo and Noise Control (IWAENC2003), Sep. 2003, Kyoto, Japan.

Holger Carl et al., "Bandwidth Enhancement of Narrow-Band Speech Signals," Signal Processing VII: Theories and Applications @1993 Supplied by the British Library—The World's Knowledge.

Chennoukh et al.: "Speech Enhancement Via Frequency Bandwidth Extension Using Line Spectral Frequencies", 2001, IEEE, Phillips Research Labs, pp. 665-668.

Hsu: "Robust bandwidth extension of narrowband speech", Master thesis, Department of Electrical & Computer Engineering, McGill University, Canada, Nov. 2004, all pages.

EPC Communication pursuant to Article 94(3), for App. No. 09707285.4, mailed Dec. 12, 2011, all pages.

J. Epps et al.,"A New Technique for Wideband Enhancement of Coded Narrowband Speech," Proc. 1999 IEEE Workshop on Speech Coding, pp. 174-176, Porvoo, Finland, Jun. 1999.

KIPO's Notice of Preliminary Rejection (English Translation) for application No. KR 10-2010-7011802, Jul. 12, 2011, all pages.

Larsen et al.: "Efficient high-frequency bandwidth extension of music and speech", Audio Engineering Society Convention Paper, Presented at the 112th Convention, May 2002, all pages.

European Patent Office, "Exam Report" for European Patent Application No. 08854969.6 dated Feb. 21, 2013, 4 pages.

The State Intellectual Property Office of the People's Republic of China, Notification of Third Office Action for Chinese Patent Application No. 200980104372.6 dated Oct. 25, 2012, 10 pages.

Russian Federation, "Decision on Grant" for Russian Patent Application No. 2011110493 dated Dec. 17, 2012, 4 pages.

(56) References Cited

OTHER PUBLICATIONS

United States Patent and Trademark Office, "Notice of Allowance and Fee(s) Due" for U.S. Appl. No. 12/024,620 dated Nov. 13, 2012, 12 pages.
General Aspects of Digital Transmission Systems; Terminal Equipments; 7 kHz Audio-Coding Within 64 Kbit/s; ITU-T Recommendation G.722, International Telecommunication Union; 1988.
3rd General Partnership Project; Technical Specification Group Services and System Aspects; Speech Codec speech processing functions; AMR Wideband Speech Code; General Description (Release 5); Global System for Mobile Communications; 3GPP TS 26.171, 2001.
F. Henn, R. Bohm, S. Meltzer, T. Ziegler, "Spectral Band Replication (SBR) Technology and its Application in Broadcasting," 2003.
H. Yasukawa, "Implementation of Frequency-Domain Digital Filter for Speech Enhancement," ICECS Proceedings, vol. 1, pp. 518-521, 1996.
J. Makhoul, M. Berouti, "High Frequency Regeneration in Speech Coding Systems," ICASSP Proceedings, pp. 428-431, 1979.
A. McCree, "A 14 kb/s Wideband Speech Coder with a Parametric Highband Model," ICASSP Proceedings, pp. 1153-1156, 2000.
H. Tolba, D. O'Shaughnessy, "On the Application of the AM-FM Model for the Recovery of Missing Frequency Bands of Telephone Speech," ICSLP Proceedings, pp. 1115-1118, 1998.
C-F. Chan, and W-K. Jui, "Wideband Enhancement of Narrowband Coded Speech Using MBE Re-Synthesis," ICSP Proceedings, pp. 667-670, 1996.
N. Enbom, W.B. Kleijn, "Bandwidth Expansion of Speech based on Vector Quantization of the Mel-Frequency Cepstral Coefficients," Speech Coding Workshop Proceedings, pp. 171-173, 1999.
B. Iser, G. Schmidt, "Neural Networks versus Codebooks in an Application for Bandwidth Extension of Speech Signals," European Conference on Speech Communication Technology, 2003.
G. Miet, A. Gerrits, J.C. Valiere, "Low-band Extension of Telephone band Speech," ICASSP Proceedings, pp. 1851-1854, 2000.
Y. Nakatoh, M. Tsushima, T. Norimatsu, "Generation of Broadband Speech from Narrowband Speech using Piecewise Linear Mapping," Eurospeech Proceedings, pp. 1643-1646, 1997.
M. Nilsson, V. Andersen, and W.B. Kleijn, "On the Mutual Information between Frequency Bands in Speech," ICASSP Proceedings, pp. 1327-1330, 2000.
M. Jasiuk and T. Ramabadran, "An Adaptive Equalizer for Analysis-by-Synthesis Speech Coders," EUSIPCO Proceedings, 2006.
Martine Wolters et al., "A closer look into MPEG-4 High Efficiency AAC," Audio Engineering Society Convention Paper presented at the 115th Convention, Oct. 10-13, 2003, New York, USA.
Arora, et al., "High Quality Blind Bandwidth Extension of Audio for Portable Player Applications," Proceedings of the AES 120th Convention, May 20-23, 2006, Paris, France, pp. 1-6.
Annadana, et al., "A Novel Audio Post-Processing Toolkit for the Enhancement of Audio Signals Coded at Low Bit Rates," Proceedings of the AES 123rd Convention, Oct. 5-8, 2007, New York, NY, USA, pp. 1-7.
Epps et al Speech Enhancement Using STC-Based Bandwidth Extension 19981001, Oct. 1, 1998, p. P711, XP007000515; section 3.6.
Chinese Patent Office (SIPO) Second Office Action for Chinese Patent Application No. 200980103691.5 dated Aug. 3, 2012, 12 pages.
The State Intellectual Property Office of the People'S Republic of China, Notification of Second Office Action for U.S. Appl. No. 201080006565.0, dated Jun. 26, 2013, 9 pages.

* cited by examiner

600

METHOD AND APPARATUS TO FACILITATE PROVISION AND USE OF AN ENERGY VALUE TO DETERMINE A SPECTRAL ENVELOPE SHAPE FOR OUT-OF-SIGNAL BANDWIDTH CONTENT

TECHNICAL FIELD

This invention relates generally to rendering audible content and more particularly to bandwidth extension techniques.

BACKGROUND

The audible rendering of audio content from a digital representation comprises a known area of endeavor. In some application settings the digital representation comprises a complete corresponding bandwidth as pertains to an original audio sample. In such a case, the audible rendering can comprise a highly accurate and natural sounding output. Such an approach, however, requires considerable overhead resources to accommodate the corresponding quantity of data. In many application settings, such as, for example, wireless communication settings, such a quantity of information cannot always be adequately supported.

To accommodate such a limitation, so-called narrow-band speech techniques can serve to limit the quantity of information by, in turn, limiting the representation to less than the complete corresponding bandwidth as pertains to an original audio sample. As but one example in this regard, while natural speech includes significant components up to 8 kHz (or higher), a narrow-band representation may only provide information regarding, say, the 300-3,400 Hz range. The resultant content, when rendered audible, is typically sufficiently intelligible to support the functional needs of speech-based communication. Unfortunately, however, narrow-band speech processing also tends to yield speech that sounds muffled and may even have reduced intelligibility as compared to full-band speech.

To meet this need, bandwidth extension techniques are sometimes employed. One artificially generates the missing information in the higher and/or lower bands based on the available narrow-band information as well as other information to select information that can be added to the narrow-band content to thereby synthesize a pseudo wide (or full) band signal. Using such techniques, for example, one can transform narrow-band speech in the 300-3400 Hz range to wideband speech, say, in the 100-8000 Hz range. Towards this end, a critical piece of information that is required is the spectral envelope in the high-band (3400-8000 Hz). If the wideband spectral envelope is estimated, the high-band spectral envelope can then usually be easily extracted from it. One can think of the high-band spectral envelope as comprised of a shape and a gain (or equivalently, energy).

By one approach, for example, the high-band spectral envelope shape is estimated by estimating the wideband spectral envelope from the narrow-band spectral envelope through codebook mapping. The high-band energy is then estimated by adjusting the energy within the narrow-band section of the wideband spectral envelope to match the energy of the narrow-band spectral envelope. In this approach, the high-band spectral envelope shape determines the high-band energy and any mistakes in estimating the shape will also correspondingly affect the estimates of the high-band energy.

In another approach, the high-band spectral envelope shape and the high-band energy are separately estimated, and the high-band spectral envelope that is finally used is adjusted to match the estimated high-band energy. By one related approach the estimated high-band energy is used, besides other parameters, to determine the high-band spectral envelope shape. However, the resulting high-band spectral envelope is not necessarily assured of having the appropriate high-band energy. An additional step is therefore required to adjust the energy of the high-band spectral envelope to the estimated value. Unless special care is taken, this approach will result in a discontinuity in the wideband spectral envelope at the boundary between the narrow-band and high-band. While the existing approaches to bandwidth extension, and, in particular, to high-band envelope estimation are reasonably successful, they do not necessarily yield resultant speech of suitable quality in at least some application settings.

In order to generate bandwidth extended speech of acceptable quality, the number of artifacts in such speech should be minimized. It is known that over-estimation of high-band energy results in annoying artifacts. Incorrect estimation of the high-band spectral envelope shape can also lead to artifacts but these artifacts are usually milder and are easily masked by the narrow-band speech.

BRIEF DESCRIPTION OF THE DRAWINGS

The above needs are at least partially met through provision of the method and apparatus to facilitate provision and use of an energy value to determine a spectral envelope shape for out-of-signal bandwidth content described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a digital audio signal having a corresponding signal bandwidth, and then provides an energy value that corresponds to at least an estimate of out-of-signal bandwidth energy as corresponds to that digital audio signal. One can then use this energy value to simultaneously determine both a spectral envelope shape and a corresponding suitable energy for the spectral envelope shape for out-of-signal bandwidth content as corresponds to the digital audio signal. By one approach, if desired, one then combines (on a frame by frame basis) the digital audio signal with the out-of-signal bandwidth content to provide a bandwidth extended version of the digital audio signal to be audibly rendered to thereby improve corresponding audio quality of the digital audio signal as so rendered.

So configured, the out-of-band energy implies the out-of-band spectral envelope; that is, the estimated energy value is used to determine the out-of-band spectral envelope, i.e., a spectral shape and a corresponding suitable energy. Such an approach proves to be relatively simple to implement and process. The single out-of-band energy parameter is easier to control and manipulate than the multi-dimensional out-of-band spectral envelope. As a result, this approach also tends to yield resultant audible content of a higher quality than at least some of the prior art approaches used to date.

Figure 1:
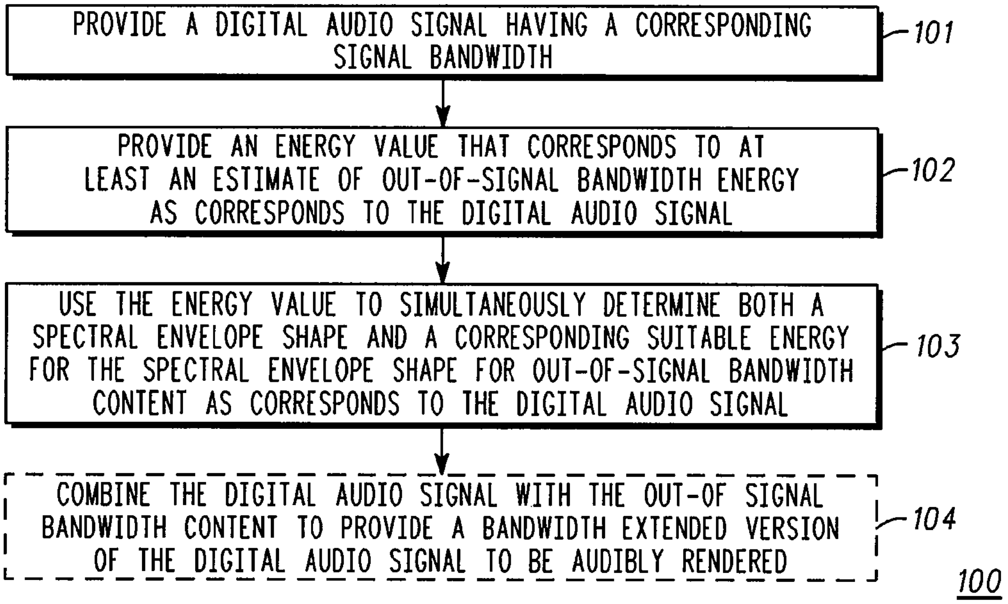
FIG. 1 comprises a flow diagram as configured in accordance with various embodiments of the invention.

These and other benefits may become clearer upon making a thorough review and study of the following detailed description. Referring now to the drawings, and in particular to FIG. 1, a corresponding process 100 can begin with provision 101 of a digital audio signal that has a corresponding signal bandwidth. In a typical application setting, this will comprise providing a plurality of frames of such content. These teachings will readily accommodate processing each such frame as per the described steps. By one approach, for example, each such frame can correspond to 10-40 milliseconds of original audio content.

This can comprise, for example, providing a digital audio signal that comprises synthesized vocal content. Such is the case, for example, when employing these teachings in conjunction with received vo-coded speech content in a portable wireless communications device. Other possibilities exist as well, however, as will be well understood by those skilled in the art. For example, the digital audio signal might instead comprise an original speech signal or a re-sampled version of either an original speech signal or synthesized speech content.

Figure 2:
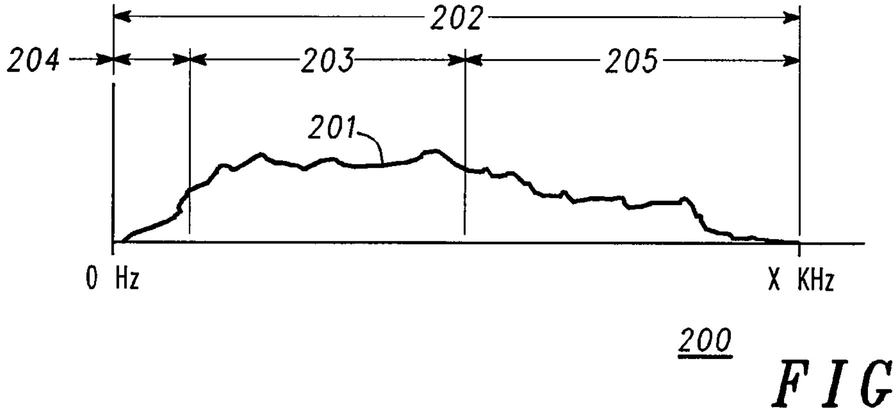
FIG. 2 comprises a graph as configured in accordance with various embodiments of the invention.

Referring momentarily to FIG. 2, it will be understood that this digital audio signal pertains to some original audio signal 201 that has an original corresponding signal bandwidth 202. This original corresponding signal bandwidth 202 will typically be larger than the aforementioned signal bandwidth as corresponds to the digital audio signal. This can occur, for example, when the digital audio signal represents only a portion 203 of the original audio signal 201 with other portions being left out-of-band. In the illustrative example shown, this includes a low-band portion 204 and a high-band portion 205. Those skilled in the art will recognize that this example serves an illustrative purpose only and that the unrepresented portion may only comprise a low-band portion or a high-band portion. These teachings would also be applicable for use in an application setting where the unrepresented portion falls mid-band to two or more represented portions (not shown).

It will therefore be readily understood that the unrepresented portion(s) of the original audio signal 201 comprise content that these present teachings may reasonably seek to replace or otherwise represent in some reasonable and acceptable manner. It will also be understood this signal bandwidth occupies only a portion of the Nyquist bandwidth determined by the relevant sampling frequency. This, in turn, will be understood to further provide a frequency region in which to effect the desired bandwidth extension.

Referring again to FIG. 1, this process 100 then provides 102 an energy value that corresponds to at least an estimate of the out-of-signal bandwidth energy as corresponds to the digital audio signal. For many application settings, this can be based, at least in part, upon an assumption that the original signal had a wider bandwidth than that of the digital audio signal itself.

By one approach, this step can comprise estimating the energy value as a function, at least in part, of the digital audio signal itself. By another approach, if desired, this can comprise receiving information from the source that originally transmitted the aforementioned digital audio signal that represents, directly or indirectly, this energy value. The latter approach can be useful when the original speech coder (or other corresponding source) includes the appropriate functionality to permit such an energy value to be directly or indirectly measured and represented by one or more corresponding metrics that are transmitted, for example, along with the digital audio signal itself.

This out-of-signal bandwidth energy can comprise energy that corresponds to signal content that is higher in frequency than the corresponding signal bandwidth of the digital audio signal. Such an approach is appropriate, for example, when the aforementioned removed content itself comprises content that occupies a bandwidth that is higher in frequency than the audio content that is directly represented by the digital audio signal. In the alternative, or in combination with the above, this out-of-signal bandwidth energy can correspond to signal content that is lower in frequency than the corresponding signal bandwidth of the digital audio signal. This approach, of course, can complement that situation which exists when the aforementioned removed content itself comprises content that occupies a bandwidth that is lower in frequency than the audio content that is directly represented by the digital audio signal.

This process 100 then uses 103 this energy value (which may comprise multiple energy values when multiple discrete removed portions are represented thereby as suggested above) to determine a spectral envelope shape to suitably represent the out-of-signal bandwidth content as corresponds to the digital audio signal. This can comprise, for example, using the energy value to simultaneously determine a spectral envelope shape and a corresponding suitable energy for the spectral envelope shape that is consistent with the energy value for out-of-signal bandwidth content as corresponds to the digital audio signal.

By one approach, this can comprise using the energy value to access a look-up table that contains a plurality of corresponding candidate spectral envelope shapes. By another approach, this can comprise using the energy value to access a look-up table that contains a plurality spectral envelope shapes and interpolating between two or more of these shapes to obtain the desired spectral envelope shape. By yet another approach, this can comprise selecting one of two or more look-up tables using one or more parameters derived from the digital audio signal and using the energy value to access the selected look-up table that contains a plurality of corresponding candidate spectral envelope shapes. This can comprise, if desired, accessing candidate shapes that are stored in a parametric form. These teachings will also accommodate deriving one or more such shapes as needed using an appropriate mathematical function of choice as versus extracting the shape from such a table if desired.

This process 100 will then optionally accommodate combining 104 the digital audio signal with the out-of-signal bandwidth content to thereby provide a bandwidth extended version of the digital audio signal to thereby improve the corresponding audio quality of the digital audio signal when rendered in audible form. By one approach, this can comprise combining two items that are mutually exclusive with respect to their spectral content. In such a case, such a combination can take the form, for example, of simply concatenating or otherwise joining the two (or more) segments together. By another approach, if desired, the out-of-signal bandwidth content can have a portion that is within the corresponding signal bandwidth of the digital audio signal. Such an overlap can be useful in at least some application settings to smooth and/or feather the transition from one portion to the other by combining the overlapping portion of the out-of-signal bandwidth content with the corresponding in-band portion of the digital audio signal.

Figure 3:
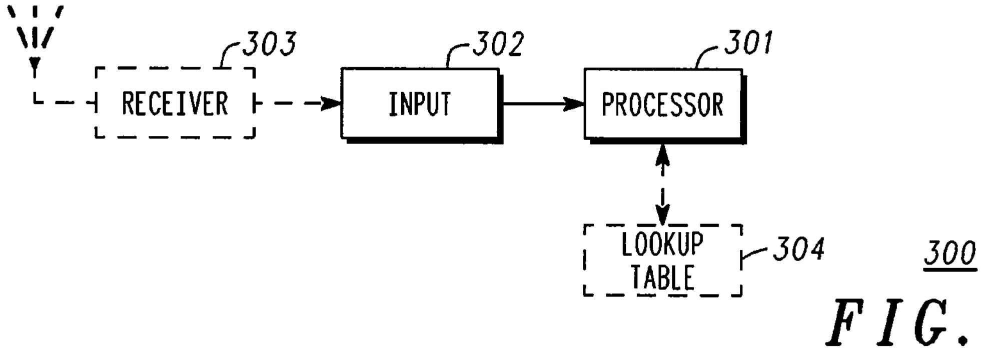
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example, in an apparatus 300 a processor 301 of choice operably couples to an input 302 that is configured and arranged to receive a digital audio signal having a corresponding signal bandwidth. When the apparatus 300 comprises a wireless two-way communications device, such a digital audio signal can be provided by a corresponding receiver 303 as is well known in the art. In such a case, for example, the digital audio signal can comprise synthesized vocal content formed as a function of received vo-coded speech content.

The processor 301, in turn, can be configured and arranged (via, for example, corresponding programming when the processor 301 comprises a partially or wholly programmable platform as are known in the art) to carry out one or more of the steps or other functionality set forth herein. This can comprise, for example, providing an energy value that corresponds to at least an estimate of out-of-signal bandwidth energy as corresponds to the digital audio signal and then using that energy value and a set of energy-indexed shapes to determine a spectral envelope shape for out-of-bandwidth content as corresponds to the digital audio signal.

As described above, by one approach, the aforementioned energy value can serve to facilitate accessing a look-up table that contains a plurality of corresponding candidate spectral envelope shapes. To support such an approach, this apparatus can also comprise, if desired, one or more look-up tables 304 that are operably coupled to the processor 301. So configured, the processor 301 can readily access the look-up table 304 as appropriate.

Those skilled in the art will recognize and understand that such an apparatus 300 may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 4:
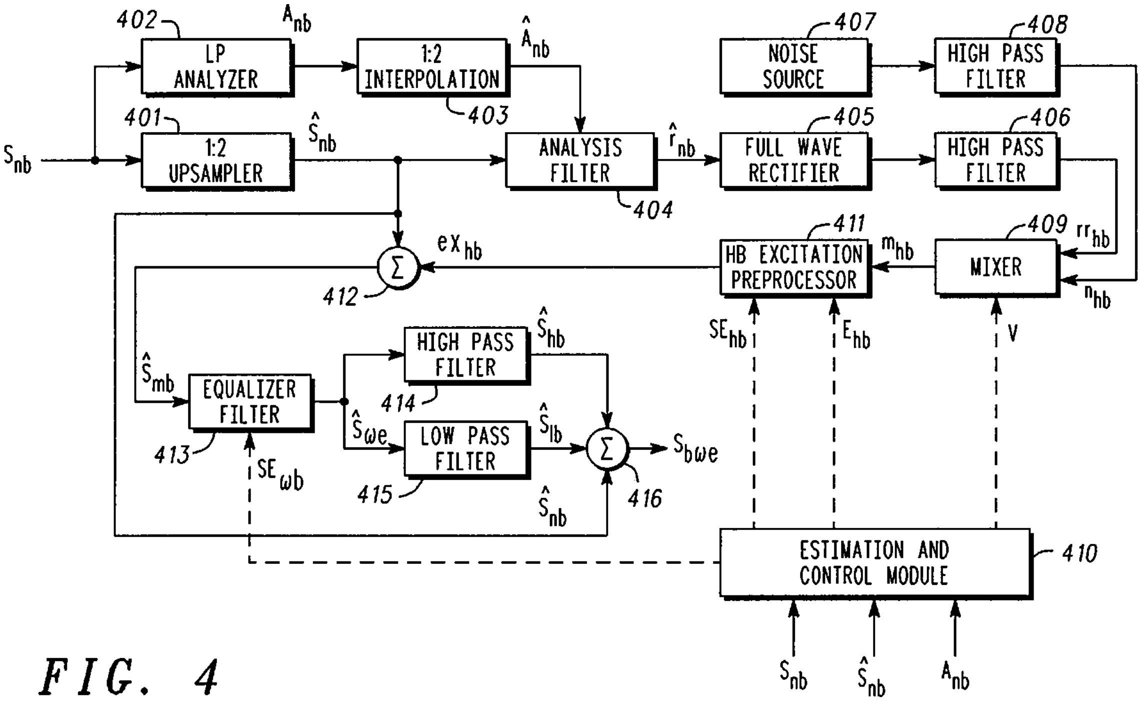
FIG. 4 comprises a block diagram as configured in accordance with various embodiments of the invention.

Referring now to FIG. 4, input narrow-band speech $s_{nb}$ sampled at 8 kHz is first up-sampled by 2 using a corresponding upsampler 401 to obtain up-sampled narrow-band speech $\acute{s}_{nb}$ sampled at 16 kHz. This can comprise performing an 1:2 interpolation (for example, by inserting a zero-valued sample between each pair of original speech samples) followed by low-pass filtering using, for example, a low-pass filter (LPF) having a pass-band between 0 and 3400 Hz.

From $s_{nb}$, the narrow-band linear predictive (LP) parameters, $A_{nb}=\{1, a_1, a_2, \ldots, a_P\}$ where P is the model order, are also computed using an LP analyzer 402 that employs well-known LP analysis techniques. (Other possibilities exist, of course; for example, the LP parameters can be computed from a 2:1 decimated version of $\acute{s}_{nb}$.) These LP parameters model the spectral envelope of the narrow-band input speech as $$SE_{nbin}(\omega) = \frac{1}{1 + a_1 e^{-j\omega} + a_2 e^{-j2\omega} + \ldots + a_P e^{-jP\omega}}.$$

In the equation above, the angular frequency ω in radians/sample is given by $\omega = 2\pi f/F_s$, where f is the signal frequency in Hz and $F_s$ is the sampling frequency in Hz. For a sampling frequency $F_s$ of 8 kHz, a suitable model order P, for example, is 10.

The LP parameters $A_{nb}$ are then interpolated by 2 using an interpolation module 403 to obtain $\acute{A}_{nb}=\{1, 0, a_1, 0, a_2, 0, \ldots, 0, a_P\}$. Using $\acute{A}_{nb}$, the up-sampled narrow-band speech $\acute{s}_{nb}$ is inverse filtered using an analysis filter 404 to obtain the LP residual signal $\acute{r}_{nb}$ (which is also sampled at 16 kHz). By one approach, this inverse (or analysis) filtering operation can be described by the equation $$\acute{r}_{nb}(n) = \acute{s}_{nb}(n) + a_1\acute{s}_{nb}(n-2) + a_2\acute{s}_{nb}(n-4) + \ldots + a_P\acute{s}_{nb}(n-2P)$$

where n is the sample index.

In a typical application setting, the inverse filtering of $\acute{s}_{nb}$ to obtain $\acute{r}_{nb}$ can be done on a frame-by-frame basis where a frame is defined as a sequence of N consecutive samples over a duration of T seconds. For many speech signal applications, a good choice for T is about 20 ms with corresponding values for N of about 160 at 8 kHz and about 320 at 16 kHz sampling frequency. Successive frames may overlap each other, for example, by up to or around 50%, in which case, the second half of the samples in the current frame and the first half of the samples in the following frame are the same, and a new frame is processed every T/2 seconds. For a choice of T as 20 ms and 50% overlap, for example, the LP parameters $A_{nb}$ are computed from 160 consecutive $s_{nb}$ samples every 10 ms, and are used to inverse filter the middle 160 samples of the corresponding $\acute{s}_{nb}$ frame of 320 samples to yield 160 samples of $\acute{r}_{nb}$.

One may also compute the 2P-order LP parameters for the inverse filtering operation directly from the up-sampled narrow-band speech. This approach, however, may increase the complexity of both computing the LP parameters and the inverse filtering operation, without necessarily increasing performance under at least some operating conditions.

The LP residual signal $\acute{r}_{nb}$ is next full-wave rectified using a full-wave rectifier 405 and high-pass filtering the result (using, for example, a high-pass filter (HPF) 406 with a pass-band between 3400 and 8000 Hz) to obtain the high-band rectified residual signal $rr_{hb}$. In parallel, the output of a pseudo-random noise source 407 is also high-pass filtered 408 to obtain the high-band noise signal $n_{hb}$. These two signals, viz., $rr_{hb}$ and $n_{hb}$, are then mixed in a mixer 409 according to the voicing level v provided by an Estimation & Control Module (ECM) 410 (which module will be described in more detail below). In this illustrative example, this voicing level v ranges from 0 to 1, with 0 indicating an unvoiced level and 1 indicating a fully-voiced level. The mixer 409 essentially forms a weighted sum of the two input signals at its output after ensuring that the two input signals are adjusted to have the same energy level. The mixer output signal $m_{hb}$ is given by $$m_{hb}=(v)rr_{hb}+(1-v)n_{hb}.$$

Those skilled in the art will appreciate that other mixing rules are also possible. It is also possible to first mix the two signals, viz., the full-wave rectified LP residual signal and the pseudo-random noise signal, and then high-pass filter the mixed signal. In this case, the two high-pass filters 406 and 408 are replaced by a single high-pass filter placed at the output of the mixer 409.

The resultant signal $m_{hb}$ is then pre-processed using a high-band (HB) excitation preprocessor 411 to form the high-band excitation signal $ex_{hb}$. The pre-processing steps can comprise: (i) scaling the mixer output signal $m_{hb}$ to match the high-band energy level $E_{hb}$, and (ii) optionally shaping the mixer output signal $m_{hb}$ to match the high-band spectral envelope $SE_{hb}$. Both $E_{hb}$ and $SE_{hb}$ are provided to the HB excitation pre-processor 411 by the ECM 410. When employing this approach, it may be useful in many application settings to ensure that such shaping does not affect the phase spectrum of the mixer output signal $m_{hb}$; that is, the shaping may preferably be performed by a zero-phase response filter.

The up-sampled narrow-band speech signal $\acute{s}_{nb}$ and the high-band excitation signal $ex_{hb}$ are added together using a summer 412 to form the mixed-band signal $\hat{s}_{mb}$. This resultant mixed-band signal $\hat{s}_{mb}$ is input to an equalizer filter 413 that filters that input using wide-band spectral envelope information $SE_{wb}$ provided by the ECM 410 to form the estimated wide-band signal $\hat{s}_{wb}$. The equalizer filter 413 essentially imposes the wide-band spectral envelope $SE_{wb}$ on the input signal $\hat{s}_{mb}$ to form $\hat{s}_{wb}$ (further discussion in this regard appears below). The resultant estimated wide-band signal $\hat{s}_{wb}$ is high-pass filtered, e.g., using a high pass filter 414 having a pass-band from 3400 to 8000 Hz, and low-pass filtered, e.g., using a low pass filter 415 having a pass-band from 0 to 300 Hz, to obtain respectively the high-band signal $\hat{s}_{hb}$ and the low-band signal $\hat{s}_{lb}$. These signals $\hat{s}_{hb}$, $\hat{s}_{lb}$, and the up-sampled narrow-band signal $\acute{s}_{nb}$ are added together in another summer 416 to form the bandwidth extended signal $s_{bwe}$.

Those skilled in the art will appreciate that there are various other filter configurations possible to obtain the bandwidth extended signal $s_{bwe}$. If the equalizer filter 413 accurately retains the spectral content of the up-sampled narrow-band speech signal $\acute{s}_{nb}$ which is part of its input signal $\hat{s}_{mb}$, then the estimated wide-band signal $\hat{s}_{wb}$ can be directly output as the bandwidth extended signal $s_{bwe}$ thereby eliminating the high-pass filter 414, the low-pass filter 415, and the summer 416. Alternately, two equalizer filters can be used, one to recover the low frequency portion and another to recover the high-frequency portion, and the output of the former can be added to high-pass filtered output of the latter to obtain the bandwidth extended signal $s_{bwe}$.

Those skilled in the art will understand and appreciate that, with this particular illustrative example, the high-band rectified residual excitation and the high-band noise excitation are mixed together according to the voicing level. When the voicing level is 0 indicating unvoiced speech, the noise excitation is exclusively used. Similarly, when the voicing level is 1 indicating voiced speech, the high-band rectified residual excitation is exclusively used. When the voicing level is in between 0 and 1 indicating mixed-voiced speech, the two excitations are mixed in appropriate proportion as determined by the voicing level and used. The mixed high-band excitation is thus suitable for voiced, unvoiced, and mixed-voiced sounds.

It will be further understood and appreciated that, in this illustrative example, an equalizer filter is used to synthesize $\hat{s}_{wb}$. The equalizer filter considers the wide-band spectral envelope $SE_{wb}$ provided by the ECM as the ideal envelope and corrects (or equalizes) the spectral envelope of its input signal $\hat{s}_{mb}$ to match the ideal. Since only magnitudes are involved in the spectral envelope equalization, the phase response of the equalizer filter is chosen to be zero. The magnitude response of the equalizer filter is specified by $SE_{wb}(\omega)/SE_{mb}(\omega)$. The design and implementation of such an equalizer filter for a speech coding application comprises a well understood area of endeavor. Briefly, however, the equalizer filter operates as follows using overlap-add (OLA) analysis.

The input signal $\hat{s}_{mb}$ is first divided into overlapping frames, e.g., 20 ms (320 samples at 16 kHz) frames with 50% overlap. Each frame of samples is then multiplied (pointwise) by a suitable window, e.g., a raised-cosine window with perfect reconstruction property. The windowed speech frame is next analyzed to estimate the LP parameters modeling its spectral envelope. The ideal wide-band spectral envelope for the frame is provided by the ECM. From the two spectral envelopes, the equalizer computes the filter magnitude response as $SE_{wb}(\omega)/SE_{mb}(\omega)$ and sets the phase response to zero. The input frame is then equalized to obtain the corresponding output frame. The equalized output frames are finally overlap-added to synthesize the estimated wide-band speech $\hat{s}_{wb}$.

Those skilled in the art will appreciate that besides LP analysis, there are other methods to obtain the spectral envelope of a given speech frame, e.g., cepstral analysis, piecewise linear or higher order curve fitting of spectral magnitude peaks, etc.

Those skilled in the art will also appreciate that instead of windowing the input signal $\hat{s}_{mb}$ directly, one could have started with windowed versions of $\acute{s}_{nb}$, $rr_{hb}$, and $n_{hb}$ to achieve the same result. It may also be convenient to keep the frame size and the percent overlap for the equalizer filter the same as those used in the analysis filter block used to obtain $\acute{r}_{nb}$ from $\acute{s}_{nb}$.

The described equalizer filter approach to synthesizing $\hat{s}_{wb}$ offers a number of advantages: i) Since the phase response of the equalizer filter 413 is zero, the different frequency components of the equalizer output are time aligned with the corresponding components of the input. This can be useful for voiced speech because the high energy segments (such as glottal pulse segments) of the rectified residual high-band excitation $ex_{hb}$ are time aligned with the corresponding high energy segments of the up-sampled narrow-band speech $\acute{s}_{nb}$ at the equalizer input, and preservation of this time alignment at the equalizer output will often act to ensure good speech quality; ii) the input to the equalizer filter 413 does not need to have a flat spectrum as in the case of LP synthesis filter; iii) the equalizer filter 413 is specified in the frequency domain, and therefore a better and finer control over different parts of the spectrum is feasible; and iv) iterations are possible to improve the filtering effectiveness at the cost of additional complexity and delay (for example, the equalizer output can be fed back to the input to be equalized again and again to improve performance).

Some additional details regarding the described configuration will now be presented.

High-band excitation pre-processing: The magnitude response of the equalizer filter 413 is given by $SE_{wb}(\omega)/SE_{mb}(\omega)$ and its phase response can be set to zero. The closer the input spectral envelope $SE_{mb}(\omega)$ is to the ideal spectral envelope $SE_{wb}(\omega)$, the easier it is for the equalizer to correct the input spectral envelope to match the ideal. At least one function of the high-band excitation pre-processor 411 is to move $SE_{mb}(\omega)$ closer to $SE_{wb}(\omega)$ and thus make the job of the equalizer filter 413 easier. First, this is done by scaling the mixer output signal $m_{hb}$ to the correct high-band energy level $E_{hb}$ provided by the ECM 410. Second, the mixer output signal $m_{hb}$ is optionally shaped so that its spectral envelope matches the high-band spectral envelope $SE_{hb}$ provided by the ECM 410 without affecting its phase spectrum. A second step can comprise essentially a pre-equalization step.

Low-band excitation: Unlike the loss of information in the high-band caused by the band-width restriction imposed, at least in part, by the sampling frequency, the loss of information in the low-band (0-300 Hz) of the narrow-band signal is due, at least in large measure, to the band-limiting effect of the channel transfer function consisting of, for example, a microphone, amplifier, speech coder, transmission channel, or the like. Consequently, in a clean narrow-band signal, the low-band information is still present although at a very low level. This low-level information can be amplified in a straightforward manner to restore the original signal. But care should be taken in this process since low level signals are easily corrupted by errors, noise, and distortions. An alternative is to synthesize a low-band excitation signal similar to the high-band excitation signal described earlier. That is, the low-band excitation signal can be formed by mixing the low-band rectified residual signal $rr_{lb}$ and the low-band noise signal $n_{lb}$ in a way similar to the formation of the high-band mixer output signal $m_{hb}$.

Figure 5:
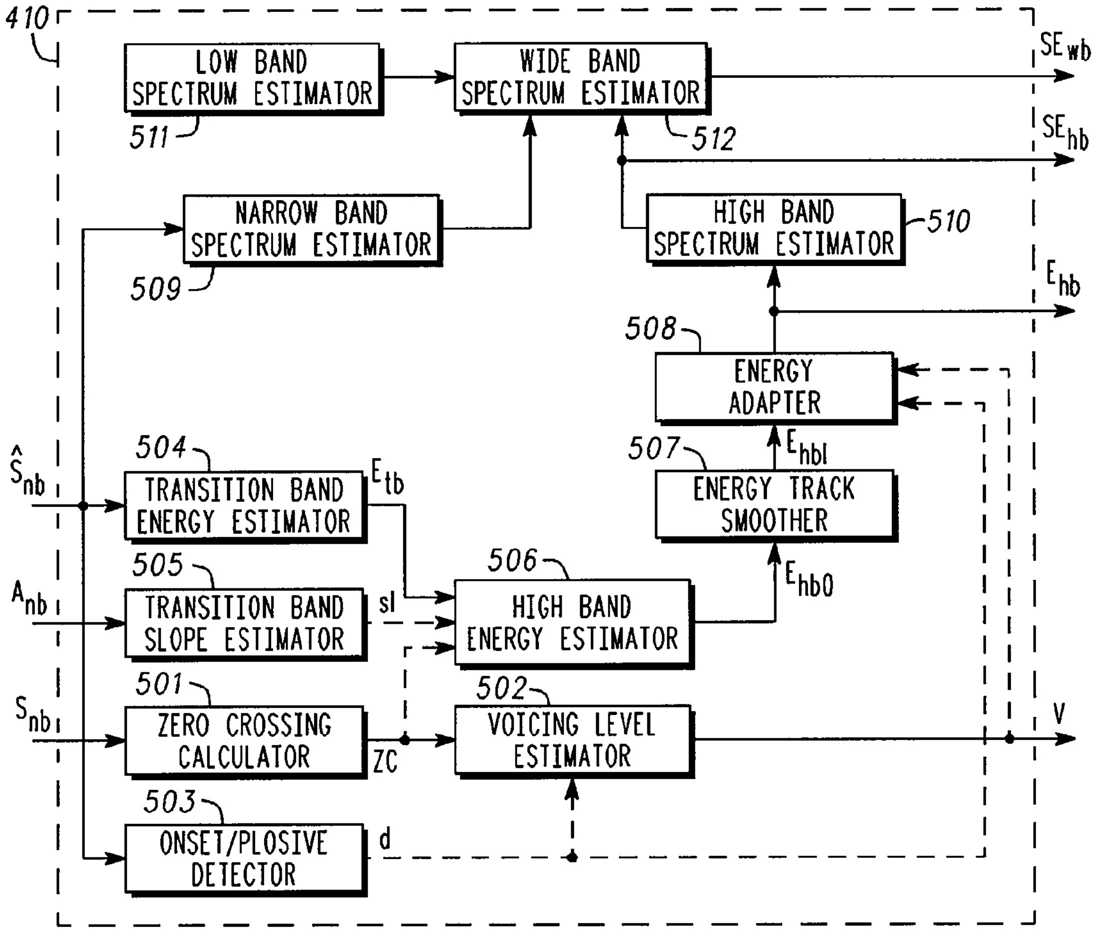
FIG. 5 comprises a block diagram as configured in accordance with various embodiments of the invention.

Referring now to FIG. 5, the Estimation and Control Module (ECM) 410 takes as input the narrow-band speech $s_{nb}$, the up-sampled narrow-band speech $\acute{s}_{nb}$, and the narrow-band LP parameters $A_{nb}$ and provides as output the voicing level v, the high-band energy $E_{hb}$, the high-band spectral envelope $SE_{hb}$, and the wide-band spectral envelope $SE_{wb}$.

Voicing level estimation: To estimate the voicing level, a zero-crossing calculator 501 calculates the number of zero-crossings zc in each frame of the narrow-band speech $s_{nb}$ as follows:

$$zc = \frac{1}{2(N-1)} \sum_{n=0}^{N-2} |\mathrm{Sgn}(s_{nb}(n)) - \mathrm{Sgn}(s_{nb}(n+1))|$$

where $$\mathrm{Sgn}(s_{nb}(n)) = \begin{cases} 1 & \text{if } s_{nb}(n) \geq 0 \\ -1 & \text{if } s_{nb}(n) < 0 \end{cases},$$

n is the sample index, and N is the frame size in samples. It is convenient to keep the frame size and percent overlap used in the ECM 410 the same as those used in the equalizer filter 413 and the analysis filter blocks, e.g., T=20 ms, N=160 for 8 kHz sampling, N=320 for 16 kHz sampling, and 50% overlap with reference to the illustrative values presented earlier. The value of the zc parameter calculated as above ranges from 0 to 1. From the zc parameter, a voicing level estimator 502 can estimate the voicing level v as follows.

$$v = \begin{cases} 1 & \text{if } zc < ZC_{low} \\ 0 & \text{if } zc > ZC_{high} \\ 1 - \left[\dfrac{zc - ZC_{low}}{ZC_{high} - ZC_{low}}\right] & \text{otherwise} \end{cases}$$

where, $ZC_{low}$ and $ZC_{high}$ represent appropriately chosen low and high thresholds respectively, e.g., $ZC_{low}$=0.40 and $ZC_{high}$=0.45. The output d of an onset/plosive detector 503 can also be fed into the voicing level detector 502. If a frame is flagged as containing an onset or a plosive with d=1, the voicing level of that frame as well as the following frame can be set to 1. Recall that, by one approach, when the voicing level is 1, the high-band rectified residual excitation is exclusively used. This is advantageous at an onset/plosive, compared to noise-only or mixed high-band excitation, because the rectified residual excitation closely follows the energy versus time contour of the up-sampled narrow-band speech thus reducing the possibility of pre-echo type artifacts due to time dispersion in the bandwidth extended signal.

In order to estimate the high-band energy, a transition-band energy estimator 504 estimates the transition-band energy from the up-sampled narrow-band speech signal $\acute{s}_{nb}$. The transition-band is defined here as a frequency band that is contained within the narrow-band and close to the high-band, i.e., it serves as a transition to the high-band, (which, in this illustrative example, is about 2500-3400 Hz). Intuitively, one would expect the high-band energy to be well correlated with the transition-band energy, which is borne out in experiments. A simple way to calculate the transition-band energy $E_{tb}$ is to compute the frequency spectrum of $\acute{s}_{nb}$ (for example, through a Fast Fourier Transform (FFT)) and sum the energies of the spectral components within the transition-band.

From the transition-band energy $E_{tb}$ in dB (decibels), the high-band energy $E_{hb0}$ in dB is estimated as $$E_{hb0} = \alpha E_{tb} + \beta,$$

where the coefficients α and β are selected to minimize the mean squared error between the true and estimated values of the high-band energy over a large number of frames from a training speech database.

The estimation accuracy can be further enhanced by exploiting contextual information from additional speech parameters such as the zero-crossing parameter zc and the transition-band spectral slope parameter sl as may be provided by a transition-band slope estimator 505. The zero-crossing parameter, as discussed earlier, is indicative of the speech voicing level. The slope parameter indicates the rate of change of spectral energy within the transition-band. It can be estimated from the narrow-band LP parameters $A_{nb}$ by approximating the spectral envelope (in dB) within the transition-band as a straight line, e.g., through linear regression, and computing its slope. The zc-sl parameter plane is then partitioned into a number of regions, and the coefficients α and β are separately selected for each region. For example, if the ranges of zc and sl parameters are each divided into 8 equal intervals, the zc-sl parameter plane is then partitioned into 64 regions, and 64 sets of α and β coefficients are selected, one for each region.

A high-band energy estimator 506 can provide additional improvement in estimation accuracy by using higher powers of $E_{tb}$ in estimating $E_{hb0}$, e.g., $$E_{hb0} = \alpha_4 E_{tb}^4 + \alpha_3 E_{tb}^3 + \alpha_2 E_{tb}^2 + \alpha_1 E_{tb} + \beta.$$

In this case, five different coefficients, viz., $\alpha_4$, $\alpha_3$, $\alpha_2$, $\alpha_1$, and β, are selected for each partition of the zc-sl parameter plane. Since the above equations (refer to paragraphs 63 and 67) for estimating $E_{hb0}$ are non-linear, special care must be taken to adjust the estimated high-band energy as the input signal level, i.e, energy, changes. One way of achieving this is to estimate the input signal level in dB, adjust $E_{tb}$ up or down to correspond to the nominal signal level, estimate $E_{hb0}$, and adjust $E_{hb0}$ down or up to correspond to the actual signal level.

While the high-band energy estimation method described above works quite well for most frames, occasionally there are frames for which the high-band energy is grossly under- or over-estimated. Such estimation errors can be at least partially corrected by means of an energy track smoother 507 that comprises a smoothing filter. The smoothing filter can be designed such that it allows actual transitions in the energy track to pass through unaffected, e.g., transitions between voiced and unvoiced segments, but corrects occasional gross errors in an otherwise smooth energy track, e.g., within a voiced or unvoiced segment. A suitable filter for this purpose is a median filter, e.g., a 3-point median filter described by the equation $$E_{hb1}(k)=\text{median}(E_{hb0}(k-1),E_{hb0}(k),E_{hb0}(k+1))$$

where k is the frame index, and the median (·) operator selects the median of its three arguments. The 3-point median filter introduces a delay of one frame. Other types of filters with or without delay can also be designed for smoothing the energy track.

The smoothed energy value $E_{hbl}$ can be further adapted by an energy adapter 508 to obtain the final adapted high-band energy estimate $E_{hb}$. This adaptation can involve either decreasing or increasing the smoothed energy value based on the voicing level parameter v and/or the d parameter output by the onset/plosive detector 503. By one approach, adapting the high-band energy value changes not only the energy level but also the spectral envelope shape since the selection of the high-band spectrum can be tied to the estimated energy.

Based on the voicing level parameter v, energy adaptation can be achieved as follows. For v=0 corresponding to an unvoiced frame, the smoothed energy value $E_{hbl}$ is increased slightly, e.g., by 3 dB, to obtain the adapted energy value $E_{hb}$. The increased energy level emphasizes unvoiced speech in the band-width extended output compared to the narrow-band input and also helps to select a more appropriate spectral envelope shape for the unvoiced segments. For v=1 corresponding to a voiced frame, the smoothed energy value $E_{hbl}$ is decreased slightly, e.g., by 6 dB, to obtain the adapted energy value $E_{hb}$. The slightly decreased energy level helps to mask any errors in the selection of the spectral envelope shape for the voiced segments and consequent noisy artifacts.

When the voicing level v is in between 0 and 1 corresponding to a mixed-voiced frame, no adaptation of the energy value is done. Such mixed-voiced frames represent only a small fraction of the total number of frames and un-adapted energy values work fine for such frames. Based on the onset/plosive detector output d, energy adaptation is done as follows. When d=1, it indicates that the corresponding frame contains an onset, e.g., transition from silence to unvoiced or voiced sound, or a plosive sound, e.g., /t/. In this case, the high-band energy of the particular frame as well as of the following frame is adapted to a very low value so that its high-band energy content is low in the band-width extended speech. This helps to avoid the occasional artifacts associated with such frames. For d=0, no further adaptation of the energy is done; i.e., the energy adaptation based on voicing level v, as described above, is retained.

The estimation of the wide-band spectral envelope $SE_{wb}$ is described next. To estimate $SE_{wb}$, one can separately estimate the narrow-band spectral envelope $SE_{nb}$, the high-band spectral envelope $SE_{hb}$, and the low-band spectral envelope $SE_{lb}$, and combine the three envelopes together.

A narrow-band spectrum estimator 509 can estimate the narrow-band spectral envelope $SE_{nb}$ from the up-sampled narrow-band speech $\acute{s}_{nb}$. From $\acute{s}_{nb}$, the LP parameters, $B_{nb}=\{1, b_1, b_2, \ldots, b_Q\}$ where Q is the model order, are first computed using well-known LP analysis techniques. For an up-sampled frequency of 16 kHz, a suitable model order Q, for example, is 20. The LP parameters $B_{nb}$ model the spectral envelope of the up-sampled narrow-band speech as $$SE_{usnb}(\omega)=\frac{1}{1+b_1e^{-j\omega}+b_2e^{-j2\omega}+\ldots+b_Qe^{-jQ\omega}}.$$

In the equation above, the angular frequency cω in radians/sample is given by $\omega=2\pi f/2F_s$, where f is the signal frequency in Hz and $F_s$ is the sampling frequency in Hz. Notice that the spectral envelopes $SE_{nbin}$ and $SE_{usnb}$ are different since the former is derived from the narrow-band input speech and the latter from the up-sampled narrow-band speech. However, inside the pass-band of 300 to 3400 Hz, they are approximately related by $SE_{usnb}(\omega)\approx SE_{nbin}(2\omega)$ to within a constant. Although the spectral envelope $SE_{usnb}$ is defined over the range 0-8000 ($F_s$) Hz, the useful portion lies within the pass-band (in this illustrative example, 300-3400 Hz).

As one illustrative example in this regard, the computation of $SE_{usnb}$ is done using FFT as follows. First, the impulse response of the inverse filter $B_{nb}(z)$ is calculated to a suitable length, e.g., 1024, as $\{1, b_1, b_2, \ldots, 0, 0 \ldots, 0\}$. Then an FFT of the impulse response is taken, and magnitude spectral envelope $SE_{usnb}$ is obtained by computing the inverse magnitude at each FFT index. For an FFT length of 1024, the frequency resolution of $SE_{usnb}$ computed as above is 16000/1024=15.625 Hz. From $SE_{usnb}$, the narrow-band spectral envelope $SE_{nb}$ is estimated by simply extracting the spectral magnitudes from within the approximate range, 300-3400 Hz.

Those skilled in the art will appreciate that besides LP analysis, there are other methods to obtain the spectral envelope of a given speech frame, e.g., cepstral analysis, piecewise linear or higher order curve fitting of spectral magnitude peaks, etc.

A high-band spectrum estimator 510 takes an estimate of the high-band energy as input and selects a high-band spectral envelope shape that is consistent with the estimated high-band energy. A technique to come up with different high-band spectral envelope shapes corresponding to different high-band energies is described next.

Starting with a large training database of wide-band speech sampled at 16 kHz, the wide-band spectral magnitude envelope is computed for each speech frame using standard LP analysis or other techniques. From the wide-band spectral envelope of each frame, the high-band portion corresponding to 3400-8000 Hz is extracted and normalized by dividing through by the spectral magnitude at 3400 Hz. The resulting high-band spectral envelopes have thus a magnitude of 0 dB at 3400 Hz. The high-band energy corresponding to each normalized high-band envelope is computed next. The collection of high-band spectral envelopes is then partitioned based on the high-band energy, e.g., a sequence of nominal energy values differing by 1 dB is selected to cover the entire range and all envelopes with energy within 0.5 dB of a nominal value are grouped together.

Figure 6:
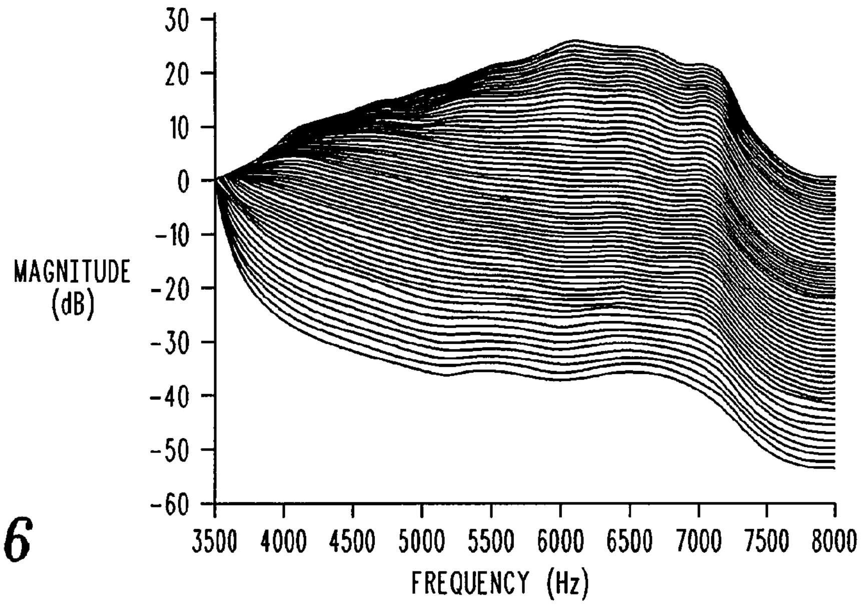
FIG. 6 comprises a graph as configured in accordance with various embodiments of the invention.

For each group thus formed, the average high-band spectral envelope shape is computed and subsequently the corresponding high-band energy. In FIG. 6, a set of 60 high-band spectral envelope shapes 600 (with magnitude in dB versus frequency in Hz) at different energy levels is shown. Counting from the bottom of the figure, the $1^{st}$, $10^{st}$, $20^{st}$, $30^{th}$, $40^{th}$, $50^{th}$ and $60^{th}$ shapes (referred to herein as pre-computed shapes) were obtained using a technique similar to the one described above. The remaining 53 shapes were obtained by simple linear interpolation (in the dB domain) between the nearest pre-computed shapes.

The energies of these shapes range from about 4.5 dB for the $1^{st}$ shape to about 43.5 dB for the $60^{th}$ shape. Given the high-band energy for a frame, it is a simple matter to select the closest matching high-band spectral envelope shape as will be described later in the document. The selected shape represents the estimated high-band spectral envelope $SE_{hb}$ to within a constant. In FIG. 6, the average energy resolution is approximately 0.65 dB. Clearly, better resolution is possible by increasing the number of shapes. Given the shapes in FIG. 6, the selection of a shape for a particular energy is unique. One can also think of a situation where there is more than one shape for a given energy, e.g., 4 shapes per energy level, and in this case, additional information is needed to select one of the 4 shapes for each given energy level. Furthermore, one can have multiple sets of shapes each set indexed by the high-band energy, e.g., two sets of shapes selectable by the voicing parameter v, one for voiced frames and the other for unvoiced frames. For a mixed-voiced frame, the two shapes selected from the two sets can be appropriately combined.

The high-band spectrum estimation method described above offers some clear advantages. For example, this approach offers explicit control over the time evolution of the high-band spectrum estimates. A smooth evolution of the high-band spectrum estimates within distinct speech segments, e.g., voiced speech, unvoiced speech, and so forth is often important for artifact-free band-width extended speech. For the high-band spectrum estimation method described above, it is evident from FIG. 6 that small changes in high-band energy result in small changes in the high-band spectral envelope shapes. Thus, smooth evolution of the high-band spectrum can be essentially assured by ensuring that the time evolution of the high-band energy within distinct speech segments is also smooth. This is explicitly accomplished by energy track smoothing as described earlier.

Note that distinct speech segments, within which energy smoothing is done, can be identified with even finer resolution, e.g., by tracking the change in the narrow-band speech spectrum or the up-sampled narrow-band speech spectrum from frame to frame using any one of the well known spectral distance measures such as the log spectral distortion or the LP-based Itakura distortion. Using this approach, a distinct speech segment can be defined as a sequence of frames within which the spectrum is evolving slowly and which is bracketed on each side by a frame at which the computed spectral change exceeds a fixed or an adaptive threshold thereby indicating the presence of a spectral transition on either side of the distinct speech segment. Smoothing of the energy track may then be done within the distinct speech segment, but not across segment boundaries.

Here, smooth evolution of the high-band energy track translates into a smooth evolution of the estimated high-band spectral envelope, which is a desirable characteristic within a distinct speech segment. Also note that this approach to ensuring a smooth evolution of the high-band spectral envelope within a distinct speech segment may also be applied as a post-processing step to a sequence of estimated high-band spectral envelopes obtained by prior-art methods. In that case, however, the high-band spectral envelopes may need to be explicitly smoothed within a distinct speech segment, unlike the straightforward energy track smoothing of the current teachings which automatically results in the smooth evolution of the high-band spectral envelope.

The loss of information of the narrow-band speech signal in the low-band (which, in this illustrative example, may be from 0-300 Hz) is not due to the bandwidth restriction imposed by the sampling frequency as in the case of the high-band but due to the band-limiting effect of the channel transfer function consisting of, for example, the microphone, amplifier, speech coder, transmission channel, and so forth.

A straight-forward approach to restore the low-band signal is then to counteract the effect of this channel transfer function within the range from 0 to 300 Hz. A simple way to do this is to use a low-band spectrum estimator 511 to estimate the channel transfer function in the frequency range from 0 to 300 Hz from available data, obtain its inverse, and use the inverse to boost the spectral envelope of the up-sampled narrow-band speech. That is, the low-band spectral envelope $SE_{lb}$ is estimated as the sum of $SE_{usnb}$ and a spectral envelope boost characteristic $SE_{boost}$ designed from the inverse of the channel transfer function (assuming that spectral envelope magnitudes are expressed in log domain, e.g., dB). For many application settings, care should be exercised in the design of $SE_{boost}$. Since the restoration of the low-band signal is essentially based on the amplification of a low level signal, it involves the danger of amplifying errors, noise, and distortions typically associated with low level signals. Depending on the quality of the low level signal, the maximum boost value should be restricted appropriately. Also, within the frequency range from 0 to about 60 Hz, it is desirable to design $SE_{boost}$ to have low (or even negative, i.e., attenuating) values to avoid amplifying electrical hum and background noise.

A wide-band spectrum estimator 512 can then estimate the wide-band spectral envelope by combining the estimated spectral envelopes in the narrow-band, high-band, and low-band. One way of combining the three envelopes to estimate the wide-band spectral envelope is as follows.

The narrow-band spectral envelope $SE_{nb}$ is estimated from $\acute{s}_{nb}$ as described above and its values within the range from 400 to 3200 Hz are used without any change in the wide-band spectral envelope estimate $SE_{wb}$. To select the appropriate high-band shape, the high-band energy and the starting magnitude value at 3400 Hz are needed. The high-band energy $E_{hb}$ in dB is estimated as described earlier. The starting magnitude value at 3400 Hz is estimated by modeling the FFT magnitude spectrum of $\acute{s}_{nb}$ in dB within the transition band, viz., 2500-3400 Hz, by means of a straight line through linear regression and finding the value of the straight line at 3400 Hz. Let this magnitude value by denoted by $M_{3400}$ in dB. The high-band spectral envelope shape is then selected as the one among many values, e.g., as shown in FIG. 6, that has an energy value closest to $E_{hb}$-$M_{3400}$. Let this shape be denoted by $SE_{closest}$. Then the high-band spectral envelope estimate $SE_{hb}$ and therefore the wide-band spectral envelope $SE_{wb}$ within the range from 3400 to 8000 Hz are estimated as $SE_{closest}+M_{3400}$.

Between 3200 and 3400 Hz, $SE_{wb}$ is estimated as the linearly interpolated value in dB between $SE_{nb}$ and a straight line joining the $SE_{nb}$ at 3200 Hz and $M_{3400}$ at 3400 Hz. The interpolation factor itself is changed linearly such that the estimated $SE_{wb}$ moves gradually from $SE_{nb}$ at 3200 Hz to $M_{3400}$ at 3400 Hz. Between 0 to 400 Hz, the low-band spectral envelope $SE_{lb}$ and the wide-band spectral envelope $SE_{wb}$ are estimated as $SE_{nb}+SE_{boost}$, where $SE_{boost}$ represents an appropriately designed boost characteristic from the inverse of the channel transfer function as described earlier.

As alluded to earlier, frames containing onsets and/or plosives may benefit from special handling to avoid occasional artifacts in the band-width extended speech. Such frames can be identified by the sudden increase in their energy relative to the preceding frames. The onset/plosive detector 503 output d for a frame is set to 1 whenever the energy of the preceding frame is low, i.e., below a certain threshold, e.g., −50 dB, and the increase in energy of the current frame relative to the preceding frame exceeds another threshold, e.g., 15 dB. Otherwise, the detector output d is set to 0. The frame energy itself is computed from the energy of the FFT magnitude spectrum of the up-sampled narrow-band speech $\acute{s}_{nb}$ within the narrow-band, i.e., 300-3400 Hz. As noted above, the output of the onset/plosive detector 503 d is fed into the voicing level estimator 502 and the energy adapter 508. As described earlier, whenever a frame is flagged as containing an onset or a plosive with d=1, the voicing level v of that frame as well as the following frame is set to 1. Also, the adapted high-band energy value $E_{hb}$ of that frame as well as the following frame is set to a low value.

Note that while the estimation of parameters such as spectral envelope, zero crossings, LP coefficients, band energies, and so forth has been described in the specific examples previously given as being done from the narrow-band speech in some cases and the up-sampled narrow-band speech in other cases, it will be appreciated by those skilled in the art that the estimation of the respective parameters and their subsequent use and application, may be modified to be done from the either of those two signals (narrow-band speech or the up-sampled narrow-band speech), without departing from the spirit and the scope of the described teachings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for rendering audible content in a bandwidth extension system comprising:

providing, by a speech encoder in the bandwidth extension system, a digital audio signal having a corresponding signal bandwidth;

generating, by a speech decoder in the bandwidth extension system, an energy value that represents at least an estimate of entire energy contained in an out-of-signal bandwidth content as corresponds to the digital audio signal;

generating, by the speech decoder, a starting magnitude value for the out-of-signal bandwidth spectrum;

normalizing, by the speech decoder, the energy value using the starting magnitude value;

using, by the speech decoder:

the normalized energy value to determine a spectral envelope shape; and the starting magnitude value to determine a corresponding suitable energy for the spectral envelope shape;

for the out-of-signal bandwidth content as corresponds to the digital audio signal.

2. The method of claim 1 wherein providing a digital audio signal comprises providing, by the speech encoder, synthesized vocal content.

3. The method of claim 1 wherein using the energy value comprises, at least in part, using the normalized energy value to access a look-up table containing a plurality of corresponding candidate spectral envelope shapes.

4. The method of claim 1 wherein the out-of-signal bandwidth content comprises energy that is representative of signal content that is higher in frequency than the corresponding signal bandwidth of the digital audio signal.

5. The method of claim 1 wherein the out-of-signal bandwidth content comprises energy that is representative of signal content that is lower in frequency than the corresponding signal bandwidth of the digital audio signal.

6. The method of claim 1 further comprising:

combining, by the speech decoder, the digital audio signal with the out-of-signal bandwidth content to provide a bandwidth extended version of the digital audio signal to be audibly rendered to thereby improve corresponding audio quality of the digital audio signal as so rendered.

7. The method of claim 6 wherein the out-of-signal bandwidth content overlaps with, and comprises a portion of, content that is within the corresponding signal bandwidth.

8. The method of claim 7 wherein combining the digital audio signal with the out-of-signal bandwidth content further comprises combining the portion of content that is within the corresponding signal bandwidth with a corresponding in-band portion of the digital audio signal.

9. An apparatus comprising:

an input configured and arranged to receive a digital audio signal having a corresponding signal bandwidth;

a processor operably coupled to the input and being configured and arranged to:

generate an energy value that represents at least an estimate of entire energy contained in an out-of-signal bandwidth content as corresponds to the digital audio signal;

generate a starting magnitude value for the out-of-signal bandwidth spectrum;

normalize the energy value using the starting magnitude value;

use the normalized energy value to determine a spectral envelope shape and the starting magnitude value to determine a corresponding suitable energy for the spectral envelope shape;

for the out-of-signal bandwidth content as corresponds to the digital audio signal.

10. The apparatus of claim 9 wherein the digital audio signal comprises synthesized vocal content.

11. The apparatus of claim 9 wherein the processor is further configured and arranged to use the normalized energy value and a set of energy-indexed shapes to determine a spectral envelope shape for out-of-signal bandwidth content as corresponds to the digital audio signal by, at least in part, using the normalized energy value to access a look-up table containing a plurality of corresponding candidate spectral envelope shapes.

12. The apparatus of claim 9 wherein the out-of-signal bandwidth content comprises energy that is representative of signal content that is higher in frequency than the corresponding signal bandwidth of the digital audio signal.

13. The apparatus of claim 9 wherein the out-of-signal bandwidth content comprises energy that is representative of signal content that is lower in frequency than the corresponding signal bandwidth of the digital audio signal.

14. The apparatus of claim 9 wherein the processor is further configured and arranged to:

combine the digital audio signal with the out-of-signal bandwidth content to provide a bandwidth extended version of the digital audio signal to be audibly rendered to thereby improve corresponding audio quality of digital audio signal as so rendered.

15. The apparatus of claim 14 wherein the out-of-signal bandwidth content overlaps with, and comprises a portion of, content that is within the corresponding signal bandwidth.

16. The apparatus of claim 15 wherein the processor is further configured and arranged to combine the digital audio signal with the out-of-signal bandwidth content further by combining the portion of content that is within the corresponding signal bandwidth with a corresponding in-band portion of the digital audio signal.

17. The apparatus of claim 9 wherein the apparatus comprises a two-way communications device.

18. The apparatus of claim 17 wherein the two-way communications device comprises a wireless two-way communications device.

* * * * *